United States Patent
Haertl et al.

(10) Patent No.: US 8,534,430 B2
(45) Date of Patent: Sep. 17, 2013

(54) DISC BRAKE FOR A COMMERCIAL VEHICLE

(75) Inventors: Thomas Haertl, Beutelsbach (DE); Josef Treipl, Beutelsbach (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 1038 days.

(21) Appl. No.: 12/181,130

(22) Filed: Jul. 28, 2008

(65) Prior Publication Data

US 2009/0020375 A1      Jan. 22, 2009

Related U.S. Application Data

(63) Continuation of application No. PCT/EP2007/000616, filed on Jan. 25, 2007.

(30) Foreign Application Priority Data

Jan. 26, 2006  (DE) .......................... 10 2006 003 746

(51) Int. Cl.
  *F16D 55/00* (2006.01)
  *B60T 1/06* (2006.01)

(52) U.S. Cl.
  USPC ...................................... 188/73.31; 188/73.1

(58) Field of Classification Search
  USPC ............. 188/18 A, 73.31, 73.32, 73.1, 205 R, 188/206 R
  See application file for complete search history.

(56) References Cited

U.S. PATENT DOCUMENTS

| | | | | |
|---|---|---|---|---|
| 4,494,630 A | * | 1/1985 | Stoka et al. ................... | 188/71.8 |
| 6,684,985 B1 | * | 2/2004 | Baumgartner ................ | 188/72.8 |
| 6,761,252 B1 | * | 7/2004 | Weiler et al. ................. | 188/72.7 |
| 6,869,262 B2 | * | 3/2005 | Yamashita et al. ............ | 414/217 |
| 7,469,775 B2 | * | 12/2008 | Linke et al. ................. | 188/73.38 |
| 2002/0166736 A1 | * | 11/2002 | Yunba ........................... | 188/72.5 |
| 2006/0124405 A1 | * | 6/2006 | Bieker et al. ................. | 188/71.7 |

FOREIGN PATENT DOCUMENTS

| | | | |
|---|---|---|---|
| DE | 42 43 875 | A1 | 7/1994 |
| DE | 196 19 488 | A1 | 11/1996 |
| DE | 198 55 614 | C1 | 7/2000 |
| DE | 199 07 938 | A1 | 9/2000 |
| DE | 199 07 958 | A1 | 9/2000 |
| DE | 103 04 713 | A1 | 9/2004 |
| EP | 1 256 740 | A2 | 11/2002 |
| GB | 909251 | | 10/1962 |
| JP | 2003232328 | A * | 8/2003 |

OTHER PUBLICATIONS

International Search Report dated Mar. 30, 2007 with an English translation (Four (4) pages).

* cited by examiner

*Primary Examiner* — Melody Burch
(74) *Attorney, Agent, or Firm* — Crowell & Moring LLP

(57) ABSTRACT

A commercial vehicle disc brake has a caliper that straddles a brake disc that can be functionally connected to brake pads having a brake lining supporting plate and a friction lining secured thereto. At least one closure cover encloses and hermetically seals a chamber for housing functional parts of the brake. The disc brake is designed such that the closure cover is form-fittingly connected to the brake caliper.

11 Claims, 4 Drawing Sheets

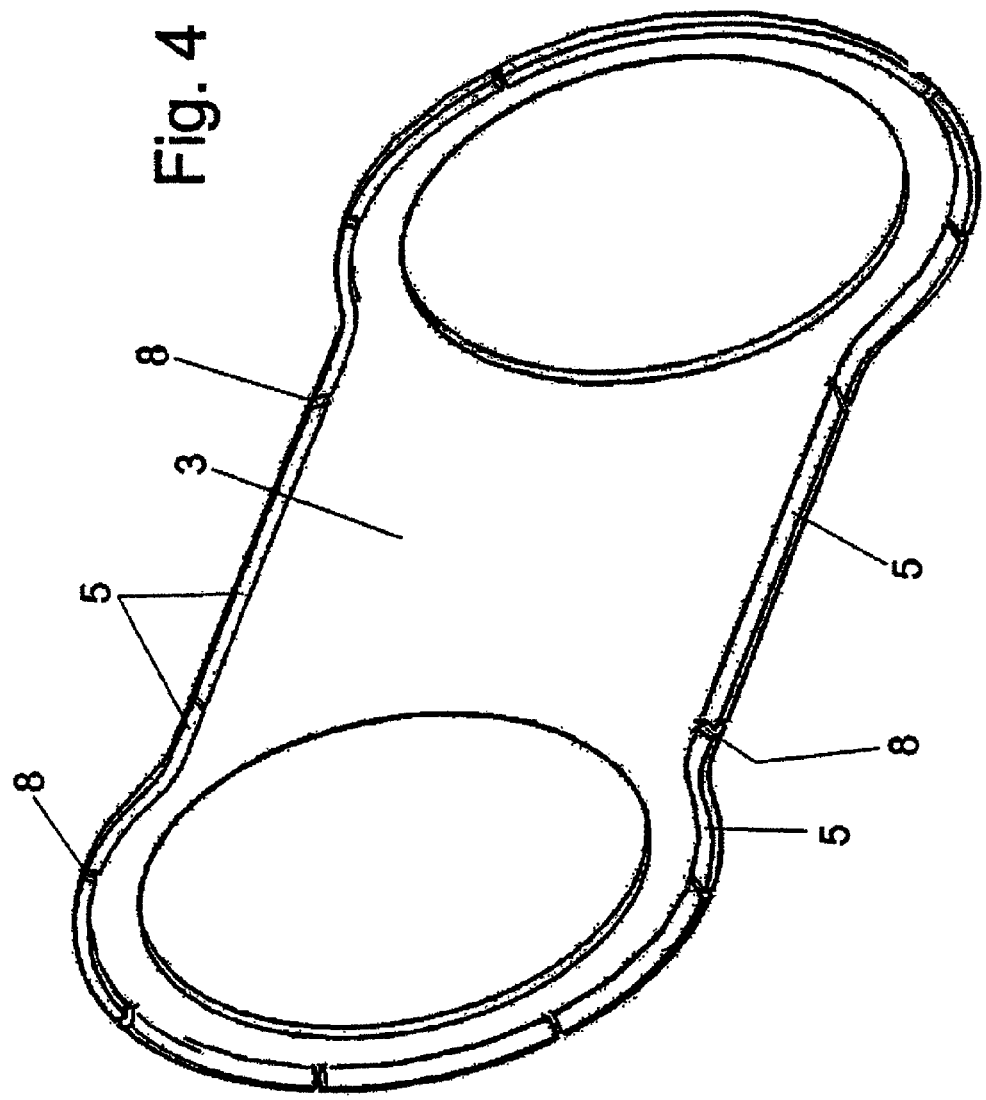

DISC BRAKE FOR A COMMERCIAL VEHICLE

CROSS-REFERENCE TO RELATED APPLICATIONS

This application is a continuation of PCT International Application No. PCT/EP2007/000616, filed on Jan. 25, 2007, which claims priority under 35 U.S.C. §119 to German Application No. 10 2006 003 746.4, filed Jan. 26, 2006, the entire disclosures of which are expressly incorporated by reference herein.

BACKGROUND AND SUMMARY OF THE INVENTION

The present invention relates to a disc brake, in particular for a commercial vehicle, having a caliper which straddles a brake disc that can be brought into operative contact with brake pads, each pad comprising a lining carrier plate and, fastened thereon, a friction lining.

A disc brake of the above-mentioned type is disclosed in DE 199 07 958 A1, for example. What is shown and described therein is that, for the purpose of protecting a housing compartment, which accommodates functional components of the brake caliper, such as actuating spindles of a brake application device or the like, a mounting and functional opening directed toward the brake disc is closed off by a closure plate. Moreover, the closure plate serves as a supporting part for various add-on parts, such as boots, seals and the like.

The closure plate is fastened by screws, which are arranged peripherally in the edge region and screwed into the caliper.

However, this type of fastening, which particularly involves monitoring the torque to which the screws are tightened, is very time-consuming and hence cost-intensive. This, therefore, constitutes an obstacle to manufacturing optimization.

To ensure effective sealing of the closure plate with respect to the brake caliper and thus prevent moisture and dirt from entering into the housing compartment, the closure cover bears in a sealed manner against the caliper. This sealing function has, to date, been provided by a cured sealing cord, which is initially mounted as a two-component seal on the closure cover in an external premounting device. For obvious reasons, this method of applying a sealant can only be performed over a considerable amount of time. Furthermore, the sealing surface of the caliper, which caliper generally takes the form of a casting, i.e., the region against which the sealing cord bears, has to be machined, in particular by milling.

Since disc brakes are mass produced in large quantities, particular importance is attached to producing the disc brake simply and rapidly, but the known construction conditions are not compatible with this.

It is therefore the object of the invention to develop a disc brake that can be produced and mounted more simply and more cost-effectively.

According to the invention, a disc brake is provided having a caliper which straddles a brake disc which can be brought into operative contact with brake pads, each pad comprising a lining carrier plate and, fastened thereon, a friction lining. At least one closure cover, which closes off and bears in a sealed manner against a caliper housing compartment for functional components of the brake caliper, is connected with a positive locking to the caliper.

By virtue of the positive locking connection between the closure cover and the caliper, there is no longer any need for preparatory work prior to mounting the closure cover, as was absolutely necessary in the case of the prior art, for example through the incorporation of threaded bores in the brake caliper. In this respect, according to an advantageous development of the invention, the closure cover is provided in its peripheral edge region with positive locking mechanisms, which correspond to positive locking mechanisms on the brake caliper.

The positive locking mechanisms of the closure cover may preferably include latching tongues which engage behind undercuts of the brake caliper so as to produce a secure connection between the closure cover and the brake caliper.

These latching tongues are elastically deformable to a certain degree, with the result that the closure cover merely has to be pressed into the edge region, comprising the undercuts, of the functional and mounting opening of the brake caliper until the latching tongues come to bear in the undercut. In principle, the closure cover is thus clipped into place.

The latching tongues are formed by making multiple slits in a fold, which moreover is integrally formed on the closure cover, and can be produced simply in so far as the closure cover is produced as a shaped or stamped sheet metal part. The undercut assigned to each latching tongue is part of an overall peripheral recess in the edge region of the mounting and functional opening of the housing compartment, said recess being incorporated during the casting of the caliper.

This positive locking connection forms not only a captive securing device for the closure cover, but also a securing device against unauthorized opening of the brake, since the closure cover cannot be detached without being destroyed.

According to a further aspect of the invention, provision is made, for the purpose of sealing the closure cover with respect to the brake caliper, and prior to mounting the closure cover, to inject a fluid seal into an intermediate space formed between the closure cover and the closure cover seat of the brake caliper, this fluid seal curing after the closure cover has been pressed in and preventing the cover from slipping.

Since this fluid seal is tailored to the surface conditions of the closure cover seat, no special machining of this region is required. This too leads to a reduction in the manufacturing and mounting effort, with the result that, together with the simplified production and mounting of the closure cover, significant advantages, in particular cost advantages, are achieved over the prior art.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 shows a graphic representation of a detail of the disc brake.

DETAILED DESCRIPTION OF THE DRAWINGS

Figure 1:
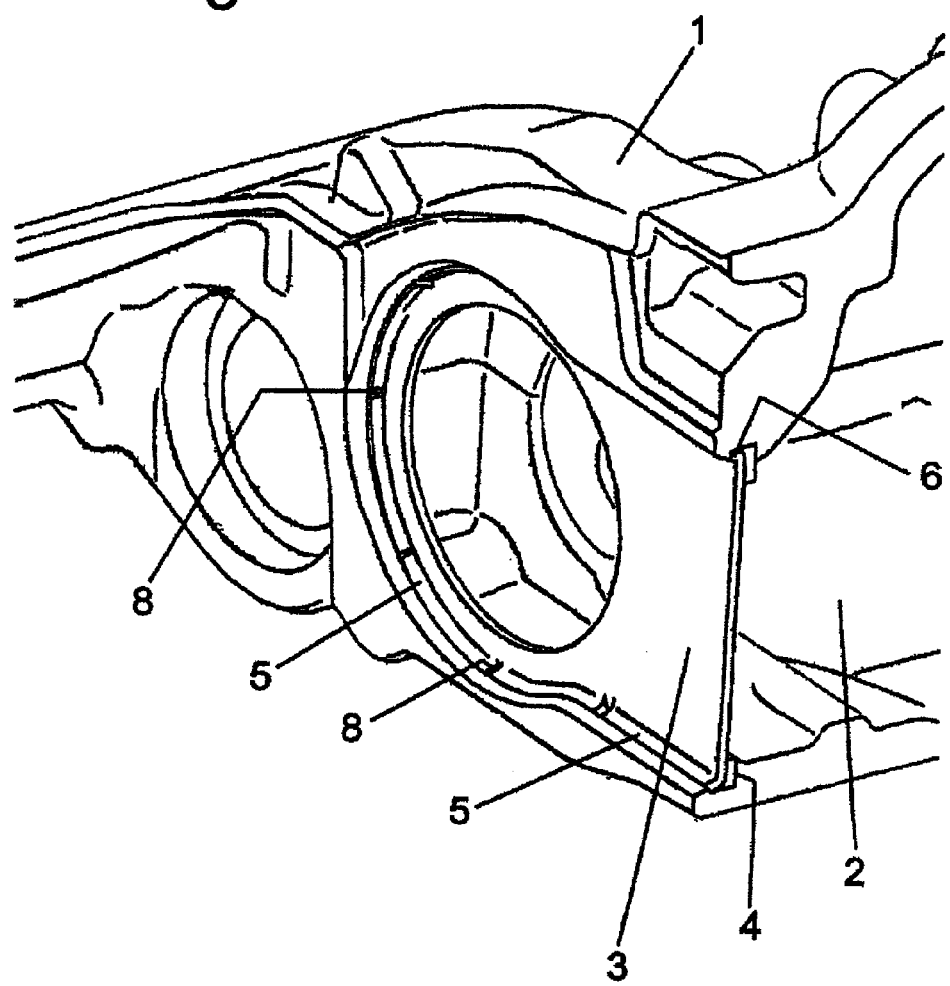
FIG. 1 shows a perspective view of part of a disc brake according to the invention.
Figure 2:
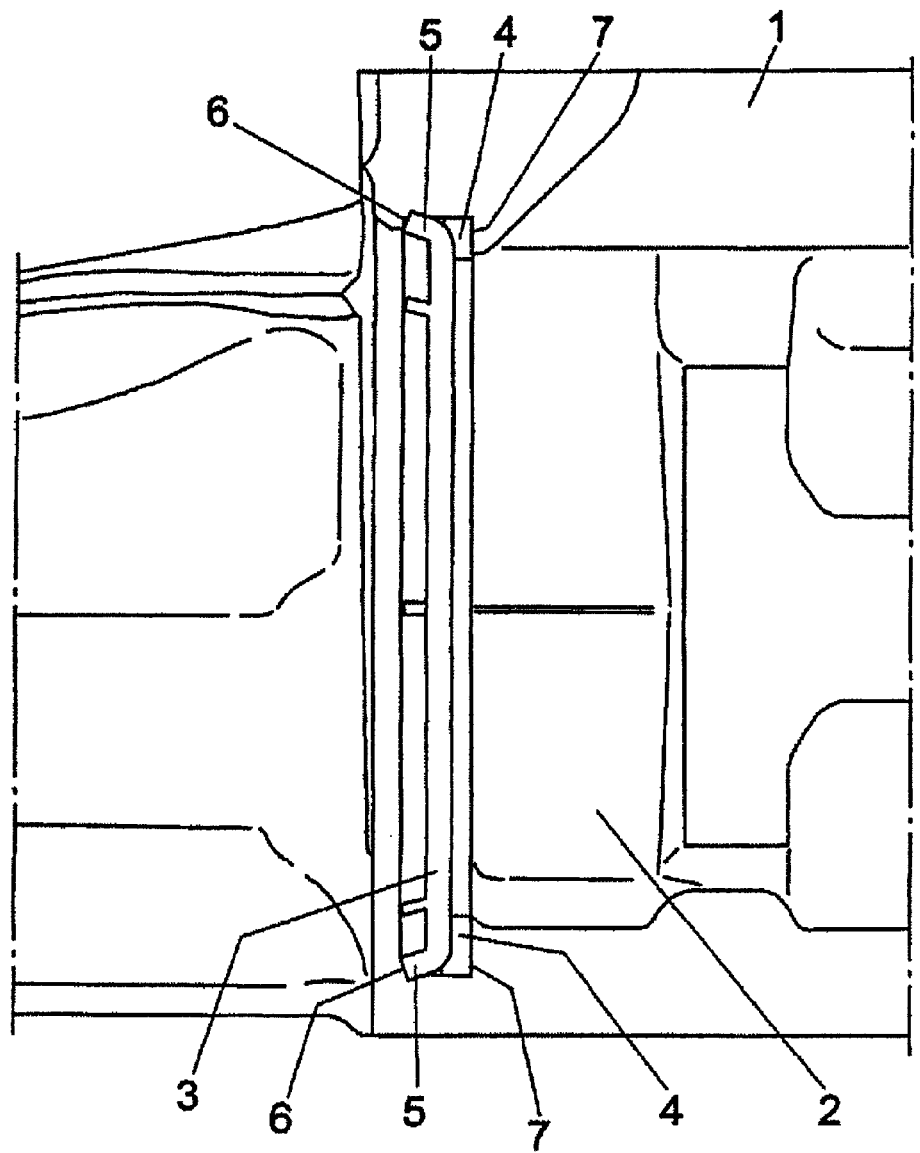
FIG. 2 shows a cross section through the part shown in FIG. 1.

FIG. 1 shows a brake caliper 1 of a disc brake, in particular for a commercial vehicle, which includes a housing compartment 2 for functional components such as actuating spindles of a brake application device or the like. The mounting and functional opening of the compartment 2 is closed off by a closure cover 3.

According to the invention, this closure cover 3 is connected with positive locking to the brake caliper 1. For this purpose, as can be seen particularly clearly in FIG. 4, the closure plate 3 is provided at its peripheral edge with a number of latching tongues 5, which are formed by an angled-away fold provided with slits 8. The latching tongues 5 of the closure cover 3, which is formed from a metal sheet, have a certain degree of elasticity.

Figure 3:
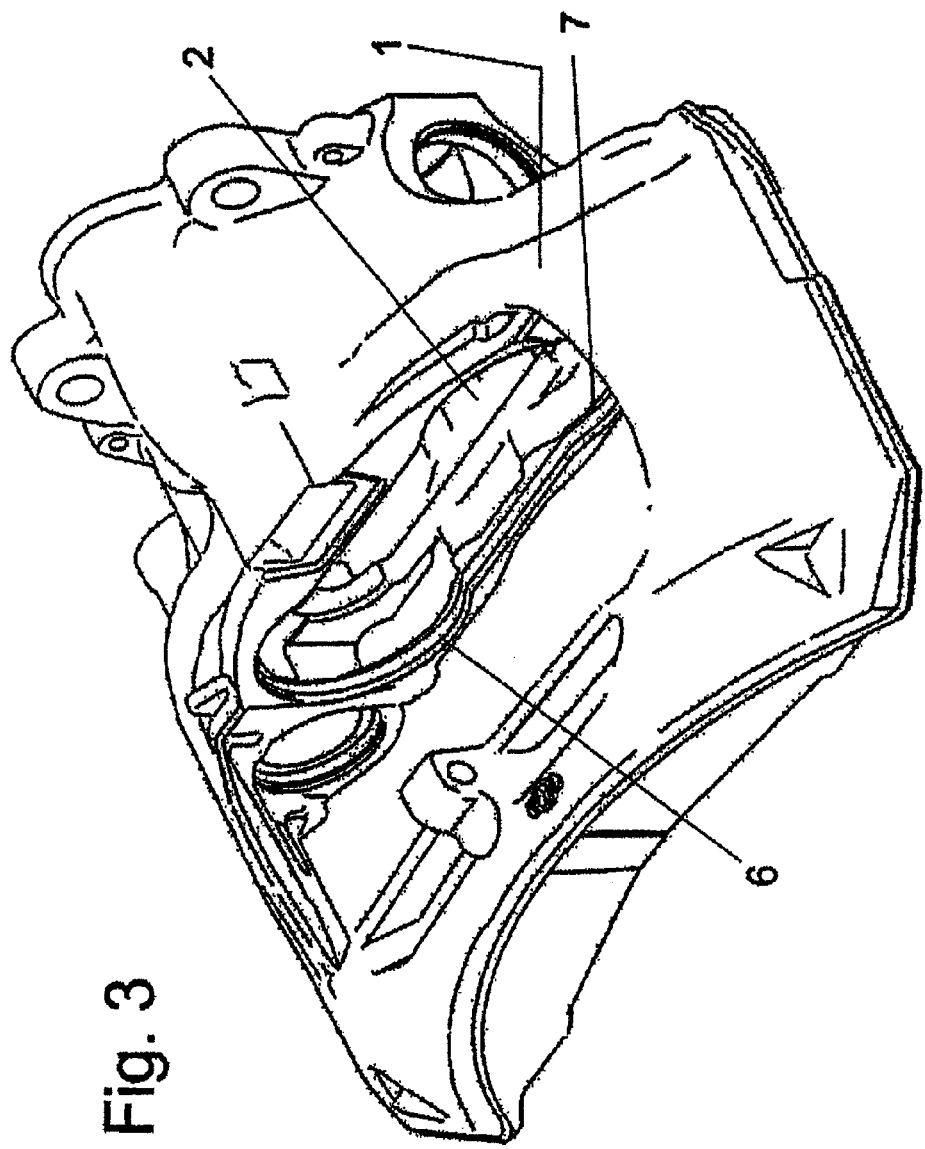
FIG. 3 shows a further perspective view of the individual part shown in FIG. 1.

FIG. 3 shows particularly clearly that the edge region of the mounting and functional opening of the housing compartment 2 is peripherally formed as a seat 7 against which the closure cover 3 is indirectly supported in the mounted position.

Prior to mounting the closure cover 3, a fluid seal is applied to the seat 7. After this, the closure cover 3 is pressed into the liquid seal 4, it being the case that the edge region of the mounting and functional opening has a peripheral undercut 6, which is engaged from behind by the latching tongues 5 after the closure cover 3 has been pressed in. Once the fluid seal 4 has cured, a firm connection between the closure cover 3 and the caliper is thus formed which, furthermore, is sufficiently sealed.

The application of the fluid seal 4 makes it easily possible to compensate for any rough casting irregularities of the seat 7, the fluid seal 4 additionally being adhesively bonded to the closure cover 3.

As is clearly evident, opening the housing compartment 2 is possible only by destroying the closure cover 3, thus constituting a quite significant improvement in terms of safety.

TABLE OF REFERENCE NUMBERS

1 Brake caliper
2 Housing compartment
3 Closure cover
4 Seal
5 Latching tongue
6 Undercut
7 Seat
8 Slit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A commercial vehicle disc brake for use with a brake disc, comprising:
   a caliper, which, in use, straddles the brake disc, the caliper having a housing compartment for housing a brake application device of the disc brake;
   a closure cover operatively configured to close-off and bear against in a sealed manner an opening of the housing compartment that faces the brake disc, the closure covering including at least one opening through which the brake application device applies the disc brake;
   wherein elastically deformable latching tongues are arranged on a peripheral edge region of the closure cover extending from the closure cover in a direction toward the brake disc, said latching tongues corresponding with a positive locking mechanism of the caliper.

2. The disc brake according to claim 1, wherein the positive locking mechanism of the caliper comprises an undercut provided in a peripheral edge region of the housing compartment opening that is closed-off by the closure cover.

3. The disc brake according to claim 1, wherein the latching tongues are formed from a periphery fold angled away from the closure cover, each respective tongue being separated from another via a slit in the fold.

4. The disc brake according to claim 2, wherein the latching tongues are formed from a periphery fold angled away from the closure cover, each respective tongue being separated from another via a slit in the fold.

5. The disc brake according to claim 1, further comprising a fluid seal between the closure cover and the caliper, wherein the fluid seal is applied to a seat provided in an edge region of the housing compartment opening prior to mounting the closure cover, the closure cover being subsequently mounted to bear against the seat.

6. The disc brake according to claim 2, further comprising a fluid seal between the closure cover and the caliper, wherein the fluid seal is applied to a seat provided in an edge region of the housing compartment opening prior to mounting the closure cover, the closure cover being subsequently mounted to bear against the seat.

7. The disc brake according to claim 3, further comprising a fluid seal between the closure cover and the caliper, wherein the fluid seal is applied to a seat provided in an edge region of the housing compartment opening prior to mounting the closure cover, the closure cover being subsequently mounted to bear against the seat.

8. The disc brake according to claim 5, wherein the fluid seal is arranged in an intermediate space formed between the closure cover and the seat.

9. The disc brake according to claim 1, wherein the closure cover is a sheet metal part.

10. The disc brake according to claim 2, wherein the closure cover is a sheet metal part.

11. The disc brake according to claim 3, wherein the closure cover is a sheet metal part.

* * * * *